(12) United States Patent
Kurosu et al.

(10) Patent No.: US 6,880,988 B2
(45) Date of Patent: Apr. 19, 2005

(54) ACTUATOR

(75) Inventors: Tomio Kurosu, Iwatsuki (JP); Toshiaki Takei, Toshima-ku (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/693,502

(22) Filed: Oct. 27, 2003

(65) Prior Publication Data

US 2004/0131349 A1 Jul. 8, 2004

Related U.S. Application Data

(63) Continuation of application No. 10/114,240, filed on Apr. 3, 2002, now Pat. No. 6,667,678.

(30) Foreign Application Priority Data

Apr. 11, 2001 (JP) ........................................ 2001-112926

(51) Int. Cl.⁷ ................................................. G03B 9/08
(52) U.S. Cl. ........................ 396/463; 396/489; 396/508
(58) Field of Search ................................ 396/463, 469, 396/470, 489, 508

(56) References Cited

U.S. PATENT DOCUMENTS

| 4,587,450 A | | 5/1986 | Ozaki | |
|---|---|---|---|---|
| 5,173,728 A | * | 12/1992 | Sangregory et al. | ........ 396/454 |
| 5,561,486 A | * | 10/1996 | SanGregory | ................ 396/463 |
| 6,027,261 A | * | 2/2000 | Naganuma | ................ 396/508 |
| 6,667,678 B1 | * | 12/2003 | Kurosu et al. | .............. 335/220 |

FOREIGN PATENT DOCUMENTS

| JP | 09-152645 | 6/1997 |
|---|---|---|
| JP | 2000-197326 | 7/2000 |
| JP | 2000-292827 | 10/2000 |
| JP | 2001-117138 | 4/2001 |

\* cited by examiner

*Primary Examiner*—David M. Gray
(74) *Attorney, Agent, or Firm*—Pillsbury Winthrop LLP

(57) ABSTRACT

An actuator is constructed so that the rotor is rotated within the range of a preset angle in a direction corresponding to the direction of current supply to the stator coil. The rotor includes a column-shaped permanent magnet having surfaces perpendicular to a center line of rotation and a surface surrounding the center line of rotation and a frame body configured integrally with the permanent magnet. The frame body covers two center portions of rotation of the permanent magnet and the surface surrounding the center line of rotation of the permanent magnet so that a plurality of exposed surfaces are provided. Each of areas in which these center portions of rotation are covered is provided with a journal supported by the bearing of the stator, and a portion extending in the radial direction from one of the center portions of rotation is provided with the output pin to be parallel to the center line of rotation.

5 Claims, 6 Drawing Sheets

ACTUATOR

This is a continuation of U.S. patent application Ser. No. 10/114,240, filed on Apr. 3, 2002, now U.S. Pat. No. 6,667,678 the contents of which are incorporated in their entirety herein as reference.

BACKGROUND OF THE INVENTION

1. Field of the Invention

This invention relates to a miniature current-controlled actuator in which when a stator coil is energized, a rotor with a permanent magnet is rotated through a preset angle in a direction corresponding to a direction in which the stator coil is energized.

2. Description of Related Art

In the technical field of a camera, a miniature current-controlled actuator, sometimes referred to as a moving-magnet motor, is known. This actuator is constructed so that when a stator coil is energized, a rotor with a permanent magnet is rotated within the range of a preset angle in a direction corresponding to a direction in which the stator coil is energized, and an output pin actuated integrally with the permanent magnet drives a member to be driven. The actuator, in contrast with a stepping motor, has significant advantages of affording low cost, compactness, and small power consumption. Thus, in the camera, it is chiefly used as a driving source for shutter blades or stop blades, but its application is not limited to the camera and can be made to various products.

For such actuators, various structures have been proposed and used, and typical examples of the structures in recent years are set forth in Japanese Patent Kokai Nos. 2000-197326 and 2000-292827. The actuators described in these publications are such that although the structures of stators, as well as those of rotors, are different from each other, magnetic poles magnetized in the radial direction of individual permanent magnets are equal in number, and even though the rotors are replaced with each other, they will function properly, insofar as they gives rise to no shape or dimension problems. Although, for the rotor, one described in the former publication appears to be simpler in fabrication, it entails the high cost of material and is hard to obtain a great magnetic force (high magnetic flux density). Consequently, in most cases, one described in the latter publication is used as an actuator for cameras.

Here, the structure of the rotor of this type will be specifically explained. The permanent magnet magnetized in the radial direction has a cylindrical shape. A rotary shaft which lies in a hollow portion of the permanent magnet and whose ends projecting therefrom are supported by bearings of the stator and an output pin (driving pin) located in the radial direction are integrally constructed of synthetic resin. Such an output pin is often provided as a single one. Even with the use of the actuator in the camera, however, two output pins may be provided at symmetrical positions of 180°, depending on the structure of the shutter blades or the stop blades, and the number of pins can be chosen properly in accordance with a desired specification. Such a component part made of synthetic resin, after being fabricated as an independent member, may be attached to the permanent magnet by cementation or force fit. In view of cost, however, it is advantageous to attach the component part to the permanent magnet on molding the component part through a so-called outsert process of injection molding.

For this actuator also, the need for further compactness has recently been emphasized. However, in the actuator of the type set forth in the above Kokai No. 2000-292827, the outside diameter of a cylindrical stator has already been reduced to as small as 4–5 mm, and the permanent magnet of the rotor has also been reduced to as small as 2 mm in diameter. Thus, the situation is that further compactness is extremely difficult. In particular, in the permanent magnet of the rotor, even when such a small diameter is slightly reduced, the proportion of a reduction in mass is increased, and it becomes difficult to ensure a preset magnetic force or to positively obtain permanent magnets within tolerances for mass production. As such, when an attempt is made to achieve further compactness, the problem arises that cost is greatly increased.

It is thus conceivable that the permanent magnet is configured into a column shape so that even when the diameter is reduced, mass which remains unchanged can be ensured. When the permanent magnet is configured into a column shape without reducing the diameter, a great magnetic force is necessarily obtained. In such a case, however, a question arises as to how portions supported by the bearings and the output pin are constructed. In order to solve this, the structure that the portions supported by the bearings and the output pin are fabricated as independent parts of special shapes so that the permanent magnet is attached to them by cementation or force fit has been proposed. However, as parts diminish in size, it becomes difficult to set up the parts, one by one, by cementation or force fit and to positively produce good rotors, and actuators thus fabricated involve high cost as a matter of course.

SUMMARY OF THE INVENTION

It is, therefore, an object of the present invention to provide a miniature, low-cost current-controlled actuator in which a stator coil is supplied with a current and thereby a rotor is rotated within the range of a preset angle in a direction corresponding to a direction in which the stator coil is supplied with the current, so that the rotor is fabricated integrally with portions supported by bearings and an output pin with respect to a column-shaped permanent magnet, through a synthetic-resin injection molding process.

In order to achieve the above object, the actuator of the present invention is constructed so that the rotor is rotated within the range of a preset angle in a direction corresponding to the direction of current supply to the stator coil. In this case, the rotor includes a column-shaped permanent magnet having surfaces perpendicular to a center line of rotation and a surface surrounding the center line of rotation and a frame body configured integrally with the permanent magnet. The frame body covers two center portions of rotation of the permanent magnet and the surface surrounding the center line of rotation of the permanent magnet so that a plurality of exposed surfaces are provided. Each of areas in which these center portions of rotation are covered is provided with a journal supported by the bearing of the stator, and a portion extending in the radial direction from one of the center portions of rotation is provided with the output pin to be parallel to the center line of rotation.

In the actuator of the present invention, at a place where each of the center portions of rotation of the permanent magnet is opposite to the frame body covering each center portion, a polygonal concavity, on one hand, is provided, and on the other hand, a convexity is configured to project into the concavity and occupy it. By doing so, the permanent magnet is favorably constructed integrally with the frame body.

Further, in the actuator of the present invention, at a place where a surface surrounding the center line of rotation of the permanent magnet is opposite to the frame body covering the surface, concavities, on one hand, are provided, and on the other hand, convexities are configured to project into the concavities and occupy them. By doing so, the permanent magnet is favorably constructed integrally with the frame body.

Still further, in the actuator of the present invention, the permanent magnet is magnetized as two magnetic poles in the radial direction, and at least one of the surfaces perpendicular to the center line of rotation has a groove configured along the boundary between the two magnetic poles. The frame body is partially provided in the groove, and the output pin is situated on an extension line of the boundary. Whereby, not only is the integration of the permanent magnet with the frame body favorably maintained, but also the positioning of the output pin in the direction of magnetization becomes very easy, in view of fabrication.

In the actuator of the present invention, when the frame body is constructed so that the output pin and another output pin are located at symmetrical positions of 180° of the permanent magnet, applications different from the case of a single output pin can be found.

This and other objects as well as the features and advantages of the present invention will becomes apparent from the following detailed description of the preferred embodiments when taken in conjunction with the accompanying drawings.

DETAILED DESCRIPTION OF THE PREFERRED EMBODIMENTS

Figure 1:
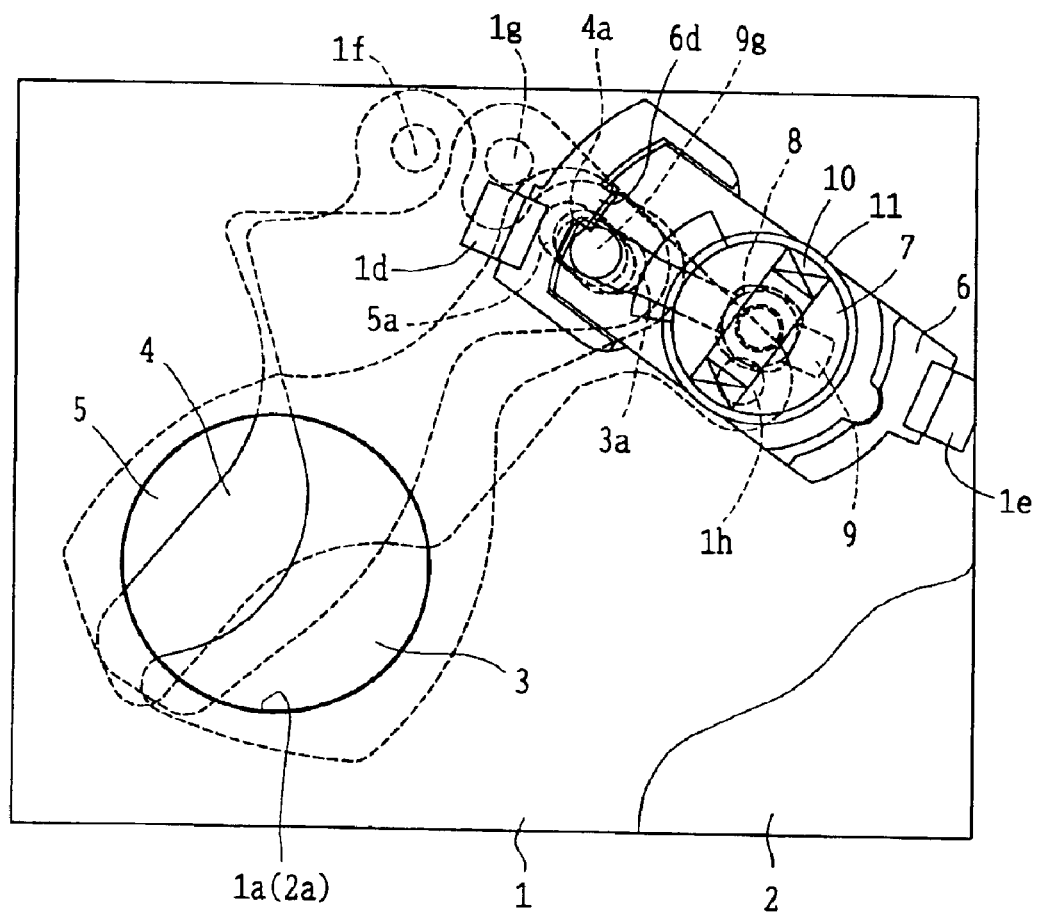
FIG. 1 is a plan view showing a case where the shutter of a shutter mechanism, viewed from the object side, is closed in a first embodiment of the present invention.
Figure 2:
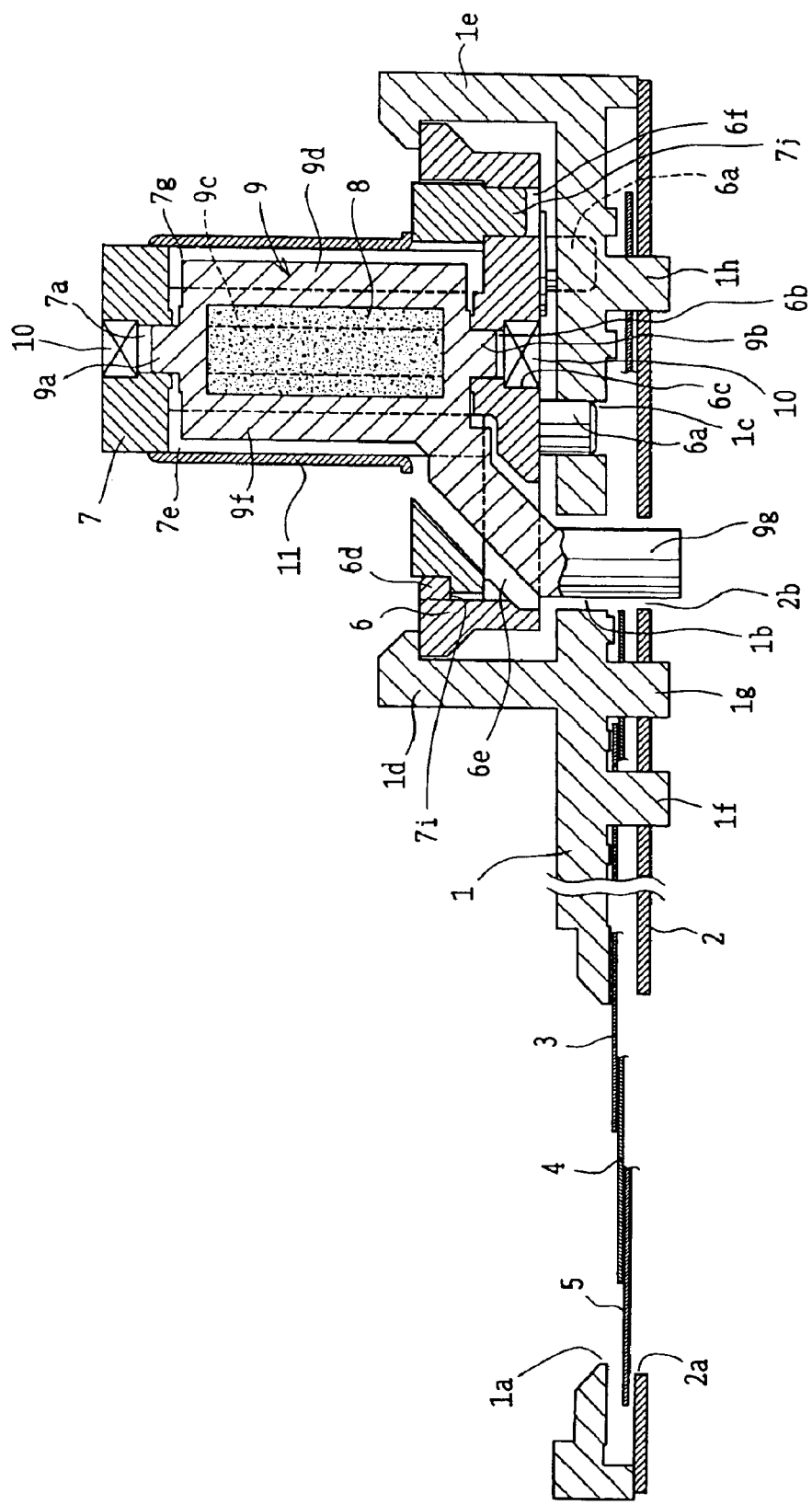
FIG. 2 is a sectional view showing essential parts in FIG. 1.

In accordance with two embodiments shown in the drawings, the present invention will be explained below.
First Embodiment This embodiment is such that the actuator of the present invention is applied to a shutter mechanism for cameras. The structure of the first embodiment is first explained. In this explanation, it is assumed that the object side is referred to as the surface side, while the opposite side is referred to as the back side. In FIG. 1, a shutter base plate 1, made of synthetic resin, is provided with a circular aperture 1a and an arcuate slot 1b, which is shown not in FIG. 1 but in FIG. 5 and whose sectional shape is shown in FIG. 2. To mount an actuator to be described later, the shutter base plate 1 has a plurality of positioning holes 1c, only one of which is depicted in FIG. 2. The shutter base plate 1 is also provided with two hooks 1d and 1e, each having flexibility, on the surface side, and three shanks 1f, 1g, and 1h for mounting three shutter blades, which will be described later, on the back side.

On the back side of the shutter base plate 1, a blade holder 2 having the same contour as the shutter base plate 1 is mounted by a means, not shown, and a blade chamber is interposed between them. The blade holder 2 is also provided with an aperture 2a of the same shape as the aperture 1a, and the aperture 2a is placed concentrically with the aperture 1a, thereby providing an exposure aperture. The blade holder 2 has a slot 2b, only a section of which is shown in FIG. 2, of almost the same shape as the slot 1b at a position opposite to the slot 1b. In addition, the blade holder 2 is provided with three holes, although not labeled in the figure, into which the shanks 1f, 1g, and 1h of the shutter base plate 1 are fitted.

Three shutter blades 3, 4, and 5 are arranged in the shutter chamber. The shutter blade 3 has a circular hole, not labeled in the figure, and a slot 3a, and the shank 1f is fitted into the circular hole so that the shutter blade 3 can be rotated. The shutter blade 4 has a circular hole, not labeled, and a slot 4a, and the shank 1g is fitted into the circular hole so that the shutter blade 4 can be rotated. The shutter blade 5 has a circular hole, not labeled, and a slot 5a, and the shank 1h is fitted into the circular hole so that the shutter blade 5 can be rotated.

On the surface side of the shutter base plate 1, the actuator is mounted. The first embodiment is such that a base frame 6 of the actuator is mounted directly to the shutter base plate 1. The base frame 6 is made of synthetic resin, and a plurality of pins 6a (two of which are shown in FIG. 2) are fitted into the positioning holes 1c of the shutter base plate 1 so that the base frame 6 is fixed to the shutter base plate 1 by the two hooks 1d and 1e mentioned above. The base frame 6, as shown in FIG. 2, is provided with a bearing hole 6b for a rotor to be described later, beneath which a concave groove 6c for mounting a coil to be described later is configured. The base frame 6 has a projection 6d, an arcuate slot 6e, and a hole 6f as well.

Figure 3A:
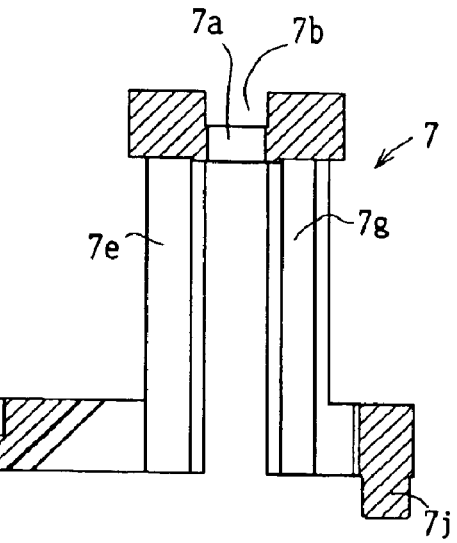
FIG. 3A is a sectional view showing a cover frame for a stator of FIG. 2.
Figure 3B:
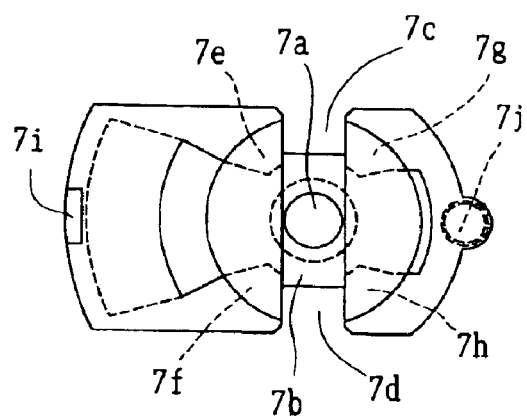
FIG. 3B is a plan view showing the cover frame of FIG. 3A.
Figure 3C:
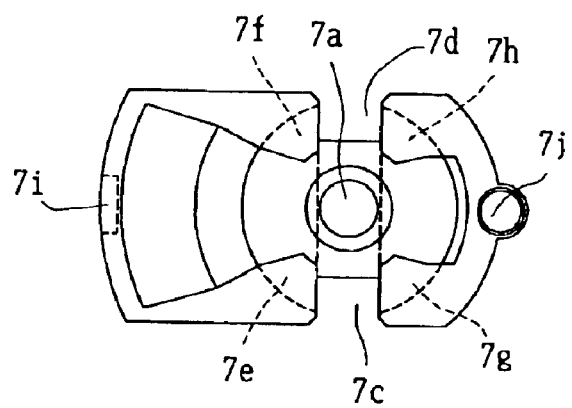
FIG. 3C is a bottom view showing the cover frame of FIG. 3A.

In FIG. 2, a cover frame 7 made of synthetic resin is placed above the base frame 6. FIGS. 3A–3C show the cover frame 7 itself. This cover frame 7 is such that an upper plate in FIG. 3A, as seen from FIG. 3B, assumes a disk-like shape as a whole and is provided with a bearing hole 7a for a rotor described later at about the middle thereof. In order to mount a coil described later, three U-shaped concave grooves 7b, 7c, and 7d are configured, including a surface provided with the hole 7a.

A lower plate in FIG. 3A is divided into two segments: one connected to the upper plate through two columns 7e and 7f, and the other connected to the upper plate through two columns 7g and 7h. One of the two segments has a step 7i and the other has a pin 7j. The step 7i is engaged with the projection 6d of the base frame 6, thereby serving to prevent the rotation of the pin 7j fitted into the hole 6f of the base frame 6. In this way, the cover frame 7 has four elongated openings in regard of the four columns 7e, 7f, 7g, and 7h, and a lower opening configured so as to join these openings is partially connected to the slot 6e of the base frame 6.

Figure 4A:
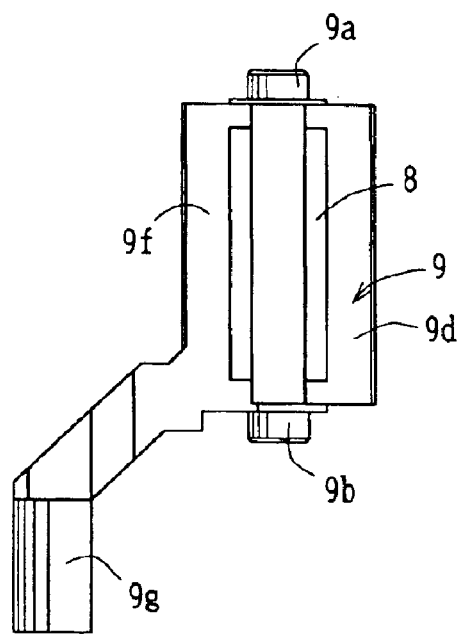
FIG. 4A is a front view showing a rotor of FIG. 2.
Figure 4C:
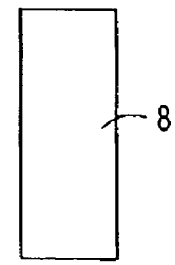
FIG. 4C is a front view showing a permanent magnet constituting the rotor.
Figure 4B:
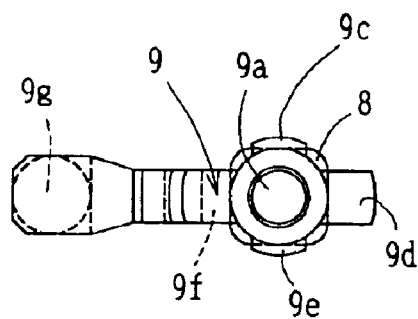
FIG. 4B is a plan view showing the rotor of FIG. 4A.

In a space enclosed with the base frame 6 and the cover frame 7, a rotor is placed. The rotor in the first embodiment, as shown in FIGS. 4A and 4B, includes a column-shaped permanent magnet 8 and a frame body 9 molded integrally with the permanent magnet 8 through an injection molding process. As seen from FIGS. 4C and 4D, the permanent magnet 8 in the present invention is shaped into a column-like form and is not provided with a hollow such as that of a conventional permanent magnet. Moreover, a column body having two surfaces perpendicular to the center line of rotation is configured so that four corners of the column body of square cross section are rounded off.

The frame body 9, on the other hand, covers the upper and lower center portions of rotation of the permanent magnet 8 and a surface surrounding the center line of rotation so that four exposed surfaces are obtained. Individual areas in which these center portions of rotation are covered have a journal 9a fitted to be rotatable into the hole 7a of the cover frame 7 and supported by the hole 7a as a bearing, and a journal 9b fitted to be rotatable into the hole 6b of the base frame 6 and supported by the hole 6b as a bearing. Also, although in the first embodiment the journals 9a and 9b are provided to the frame body 9 on the rotor side and the holes 7a and 6b are provided to the cover frame 7 and the base frame 6, respectively, on the stator side, the frame body 9 may have two holes so that two journals fitted into these holes are provided on the stator side, or the hole and the journal may be provided on each side.

The frame body 9 has four strips 9c, 9d, 9e, and 9f and is configured so that the cross section of each of the strips 9d and 9f is larger in thickness than that of each of the strips 9c and 9e. Hence, the strip 9d is interposed between the columns 7g and 7h, while the strip 9f is interposed between the columns 7e and 7f. In FIG. 4B, the permanent magnet 8 is magnetized as two magnetic poles in the radial direction, with a segment connecting these strips 9d and 9f as a boundary. Furthermore, the frame body 9 has a portion extending in the radial direction and obliquely downward and inserted in the slot 6e of the base frame 6, and at its top, an output pin 9g is configured parallel to the center line of rotation of the permanent magnet 8. The output pin 9g is inserted in the slot 1b of the shutter base plate 1 and the slot 2b of the blade holder 2 and is fitted into the slots 3a, 4a, and 5a of the shutter blades 3, 4, and 5 in the blade chamber.

As mentioned above, the rotor is supported to be rotatable to a stator frame constructed with the base frame 6 and the cover frame 7, and then a coil 10 is placed in the concave grooves 6c, 7b, 7c, and 7d in such a way that the two bearing holes 6b and 7a are covered. The peripheral surface of the cover frame 7 is fitted into a cylindrical yoke 11 in such a way that the coil 10 is enclosed. Also, the actuator is constructed so that a magnetic member, which is well known and thus is not shown in the figure, is placed close to the rotor, and the stopped state of the rotor can be maintained by utilizing an attractive force exerted between the magnetic member and the permanent magnet 8, even though the coil 10 is not energized.

Subsequently, the operation of the first embodiment will be briefly explained. In FIG. 1 showing a closed state of the shutter, the aperture 1a is closed by the three shutter blades 3, 4, and 5. In this case, the coil 10 of the actuator is not energized. In general, therefore, a stopped state of the rotor is very unstable, and there is the possibility that, for example, when a camera is shaken, the shutter blades 3, 4, and 5 are actuated to expose a film. In the first embodiment, however, the magnetic member, not shown, is placed close to the rotor, and thus the rotor is biased to rotate in a counterclockwise direction by a magnetic force exerted between the magnetic member and the permanent magnet 8. Since, however, the output pin 9g comes in contact with the end of the arcuate slot 1b provided to the shutter base plate 1, the rotation of the rotor is prevented and this state is maintained.

In FIG. 1 of such a state, when the power switch of the camera is turned on, a photometric circuit and a distance-measuring circuit are actuated. Subsequently, when a release button is pressed for photographing, an electric current is supplied in a forward direction of the coil 10. As a result, the rotor is rotated clockwise in FIG. 1, and the shutter blades 3, 4, and 5 are rotated by the output pin 9g. In this case, the shutter blades 3 and 4 are rotated counterclockwise, with the shanks 1f and 1g, respectively, as centers, and the shutter blade 5 is rotated clockwise, with the shank 1h as a center. Since the shutter blades 3 and 4 are different in the positional relationship between a supporting point and a working point, the rotation of the shutter blade 4 becomes faster than that of the shutter blade 3. Consequently, the amount of superposition of the shutter blades 3 and 4 is increased. Such rotation is stopped when the output pin 9g abuts on the end of the arcuate slot 1b provided to the shutter base plate 1, immediately after the opening 1a is fully opened. This state is shown in FIG. 5, in which the geometry of the actuator is partially omitted.

Figure 5:
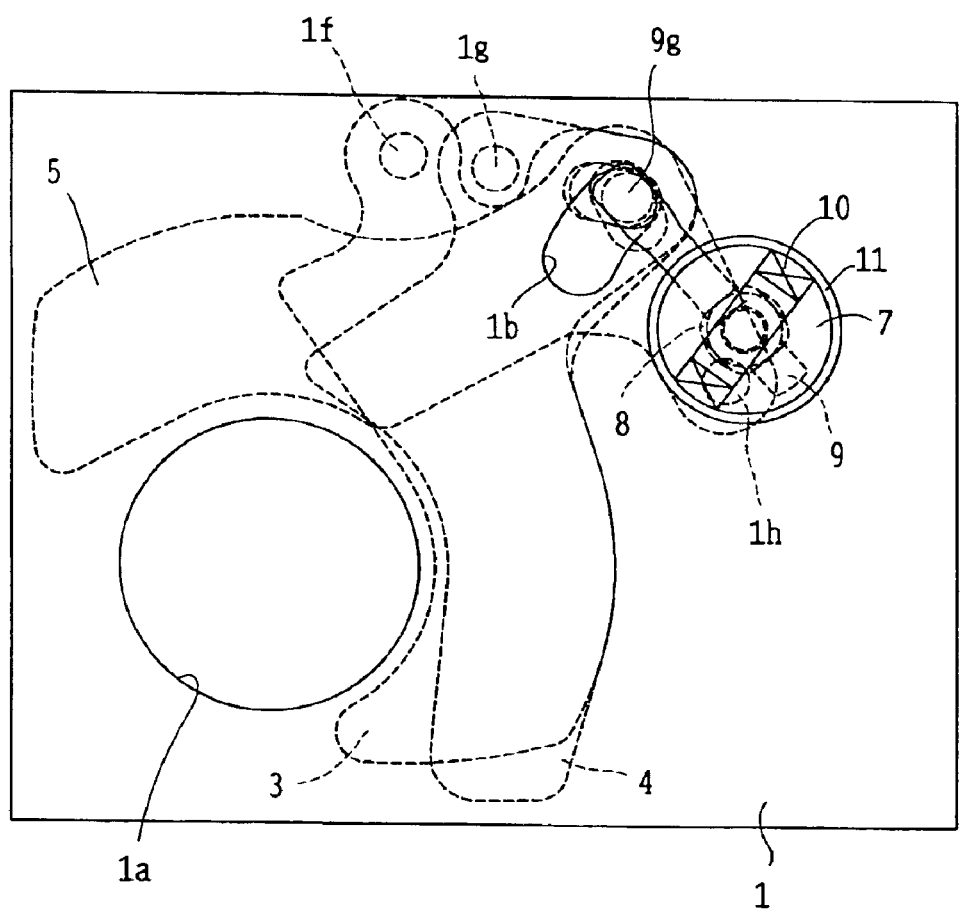
FIG. 5 is a plan view showing a case where the shutter of the shutter mechanism, viewed from the object side, is fully opened in the first embodiment.
Figure 6A:
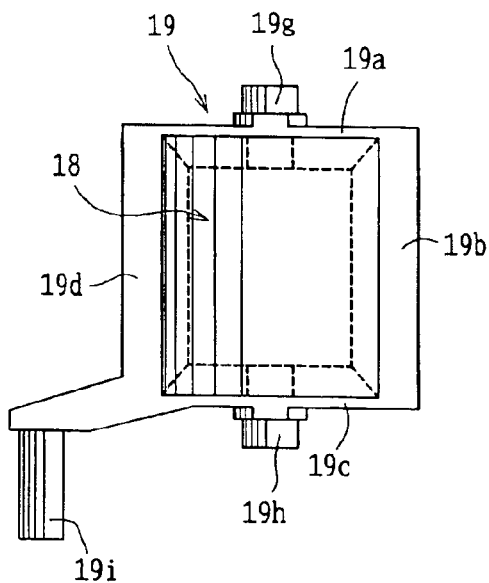
FIG. 6A is a front view showing a rotor in a second embodiment of the present invention.
Figure 6C:
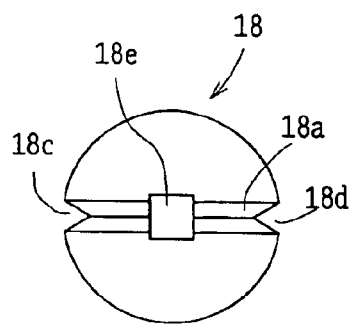
FIG. 6C is a plan view showing a permanent magnet constituting the rotor.
Figure 6B:
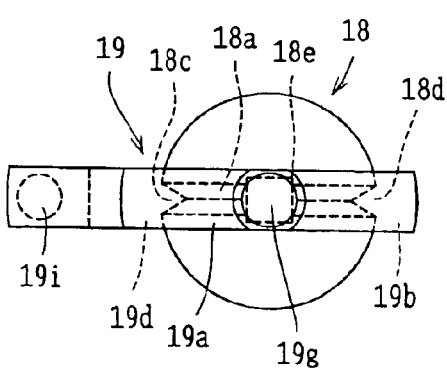
FIG. 6B is a plan view showing the rotor of FIG. 6A.
Figure 6D:
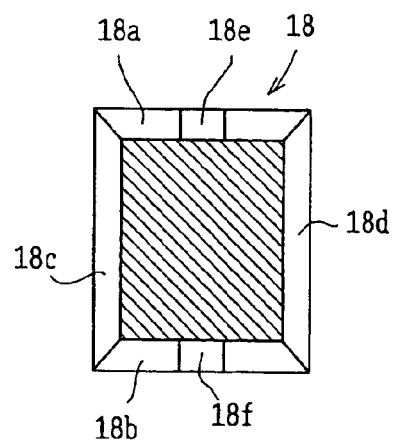
FIG. 6D is a center cross sectional view showing the permanent magnet of FIG. 6C.

Even in a state of FIG. 5, when the exposure time is short, power to the coil 10 is not disconnected, and when an aperture-closing signal is emitted, a forward current is interrupted and a reverse current is supplied. However, when the exposure time is long, power to the coil 10 is disconnected into a non-conducting condition in order to avoid battery loss. In the first embodiment, the actuator is thus designed so that even when the coil is brought into such a non-conducting condition, a state of FIG. 5 is favorably maintained. Specifically, in this state, the rotor is biased to rotate clockwise by the magnetic force between the magnetic member, not shown, and the permanent magnet 8.

After that, when the aperture-closing signal is emitted, the reverse current is supplied to the coil 10. In doing so, the rotor is rotated counterclockwise in FIG. 5, and the shutter blades 3, 4, and 5 are rotated in a direction opposite to that described above, through the output pin 9g, to close the aperture 1a. Such rotation is stopped when the output pin 9g abuts on the end of the arcuate slot 1b of the shutter base plate 1, immediately after the opening 1a is completely closed by the shutter blades 3, 4, and 5. Also, immediately after the rotation of the rotor is stopped, power to the coil 10 is disconnected to return to a state of FIG. 1, and this state is maintained until the next photographing.

In the first embodiment, as mentioned above, the permanent magnet 8 is configured into a column shape and hence is capable of obtaining a higher magnetic flux density than a conventional, cylindrical permanent magnet. Even when the permanent magnet 8 is made smaller in size than the conventional permanent magnet, the same magnetic flux density as in the conventional permanent magnet can be obtained. Hence, for example, if the dimension of the permanent magnet in the axial direction is the same, the dimension in the radial direction can be reduced, and as a result, the diameter of the yoke 11 in the first embodiment can be made smaller than in a conventional one. Furthermore, if the dimension of the permanent magnet in the radial direction is made identical, the dimension in the axial direction can be reduced, and thus the vertical dimension of the actuator in FIG. 2 can be made smaller than in the conventional one.

In the first embodiment, the frame body 9 is configured integrally with the permanent magnet 8 through the injection molding process. Even with this process, however, the interface between the permanent magnet 8 and the flame body 9 is not brought into a completely fixed condition. As such, if the strips 9c and 9e are not configured in the frame body 9, there is the fear that the permanent magnet 8 is moved or dropped from the frame body. The first embodiment, however, is constructed so that such a fear is not absolutely aroused because the permanent magnet 8 and the four strips 9c, 9d, 9e, and 9f are configured as mentioned above.

Figure 4D:
FIG. 4D is a plan view showing the permanent magnet of FIG. 4C.

Also, although the permanent magnet 8 in the first embodiment is such that each surface perpendicular to the rotary axis, as depicted in FIG. 4D, has a shape similar to a square, it may be octagonal, for instance. In this case, from the above reason, three strips may be provided. In the first embodiment, as seen from FIG. 4A, strictly speaking, a portion provided with the output pin 9g at the top extends in the radial direction of the rotor and obliquely downward at an angle of 45°. The present invention is not limited to such a shape, and the above portion may be designed to extend horizontally. In short, it is only essential that the portion extends at least in the radial direction, no matter whether it extends horizontally or obliquely or how long it extends. The same holds for the case of the second embodiment to be described later.

In the first embodiment, in order to improve the efficiency of a winding space of the coil 10 as a link in the chain of compactness, the cover frame 7 is provided with elongated openings between the columns 7e and 7g and between the columns 7f and 7h. If these openings are not necessary, the cover frame may be constructed so that they are blocked up. An elongated opening provided between the columns 7g and 7h serves for the purpose of preventing the strip 9d of the frame body 9 from coming contact with the cover frame 7. If there is no design problem, this opening may be blocked up. The same holds for the case of the second embodiment to be described blow.

Second Embodiment

The actuator of this embodiment has the same structure as that of the first embodiment with the exception that the structure of the rotor is different. Thus, the explanation of the structure of the stator is omitted, but the description of the stator alone and of the relative relationship between the stator and the rotor in the first embodiment is also applied to the case of the second embodiment. With reference to FIGS. 6A–6D, the rotor in the second embodiment will be explained below.

The rotor in the second embodiment includes a permanent magnet 18 having a shape similar to a column and a frame body 19 configured integrally with the permanent magnet 18 through the injection molding process. The permanent magnet 18 is provided with linear V grooves 18a and 18b passing through the center portions of rotation in its two surfaces perpendicular to the center line of rotation, and linear V grooves 18c and 18d extending so as to connect the V grooves 18a and 18b in its peripheral surface. The permanent magnet 18 has two magnetic poles magnetized in the radial direction, and the V grooves 18a, 18b, 18c, and 18d are provided along the boundary between the two magnetic poles. Rectangular parallelepiped-shaped concavities 18e and 18f are provided in the middle portions of the V grooves 18a and 18b, respectively, that is, in the upper and lower center portions of rotation of the permanent magnet 18.

The frame body 19, on the other hand, has four strips 19a, 19b, 19c, and 19d, of square shapes, having convexities with which the V grooves 18a, 18b, 18c, and 18d and the concavities 18e and 18f are charged. The two center portions of rotation are provided with shanks 19g and 19h supported by bearings of a stator frame. As described in the first embodiment, however, the center portions of rotation may have holes, instead of the shanks 19g and 19h, so that shanks fitted into the holes are provided on the stator side. Furthermore, the frame body 19 has a portion such that the strip 19c is extended in the radial direction and somewhat obliquely downward, and at its top, an output pin 19i is configured. Also, the actuator of the second embodiment is operated in accordance with the first embodiment, and thus the explanation of the operation is omitted.

In the second embodiment also, as mentioned above, the permanent magnet 18 is configured into a column shape and hence is capable of obtaining a higher magnetic flux density than the conventional, cylindrical permanent magnet. Hence, even when the permanent magnet 18 is made smaller in size than the conventional permanent magnet, the same magnetic flux density as in the conventional permanent magnet can be obtained. Since in the second embodiment the V grooves 18a, 18b, 18c, and 18d and the concavities 18e and 18f are provided around the permanent magnet 18 and the convexities of the strips 19a. 19b, 19c, and 19d project into them, it is avoidable that the relative positions of the permanent magnet 18 and the frame body 19 are shifted and the permanent magnet 18 is dropped from the frame body 19.

Also, in the second embodiment, the V grooves 18a, 18b, 18c, and 18d and the concavities 18e and 18f are provided around the permanent magnet 18, but even though a part or all of them are provided to the frame body 19, the purpose of the present invention can be achieved. Even when all of the V grooves 18a, 18b, 18c, and 18d and the concavities 18e and 18f are not provided, the purpose of the present invention can be achieved, but when only one of them is provided, the present invention is not worked out. Each of the V grooves 18a, 18b, 18c, and 18d can be replaced by a single hole or plurality of holes of various shapes. Although each of the concavities 18e and 18f has a square shape in FIG. 6C, its shape is not limited to the square. However, it is favorable that the concavities 18e and 18f are configured to be polygonal so that the permanent magnet 18 is not rotated with respect to the frame body 19.

The permanent magnet 18 in the second embodiment is such that the V grooves 18a, 18b, 18c, and 18d are configured on molding and two magnetic poles are magnetized in a direction perpendicular to the V grooves 18a and 18b. In the case of the two magnetic poles, it is desirable that the output pin 19i, as is well known, is situated on an extension line of the boundary between the magnetic poles. As such, when the permanent magnet is constructed as in the second embodiment, the second embodiment, in contrast with the first embodiment, has the advantages that the relative positional relationship between the output pin and the direction of magnetization is surely obtained on fabrication and the relative positions of the permanent magnet 18 and the frame body 19 remain unchanged after fabrication. Where there is no need to give special consideration to the above description or manufacturing cost, the permanent magnet may be designed so that the two V grooves 18c and 18d configured in the peripheral surface of the permanent magnet 18 are provided not at symmetrical positions of 180° as in the second embodiment, but at positions of different angles. Three or more V grooves can be configured in the peripheral surface, as the case may be.

Also, although in each of the above embodiments a single output pin is provided, a plurality of output pins can be provided, depending on the type of a mechanism to be driven. However, the actuator of this type is extremely small in size, and therefore, in view of fabrication, it is desirable that two output pins are provided. Where the actuator with the two output pins is used in a shutter or stop mechanism for cameras, it is optimum that the two output pins are located at symmetrical positions of 180°.

The actuator of the present invention, as mentioned above, is such that the current is supplied to the stator coil and thereby the rotor is rotated over the range of a preset angle in the direction of current supply. The rotor has the column-shaped permanent magnet, and the portions of the permanent magnet supported by bearings and the output pin are integrally constructed through the synthetic-resin injection molding process. Thus, the entire actuator, not to speak of the rotor, can be manufactured in small size and at low cost.

What is claimed is:

1. A blade driving device for cameras, comprising:

a base plate;

a blade; and an actuator in which a rotor is made to turn about a turning axis within a range of a preset angle in a direction determined by a direction of a current supplied to a stator coil;

wherein said rotor of said actuator includes a column-shaped permanent magnet having surfaces perpendicular to the turning axis and a surface parallel with the turning axis and a frame body configured integrally with said permanent magnet, wherein said frame body covers both ends of a turning axial region of said permanent magnet and continuously covers said surfaces perpendicular to the turning axis and said surface parallel with said turning axis of said permanent magnet in such a pattern that a plurality of exposed faces of said permanent magnet are provided, wherein said frame body is provided with a journal that is formed at each of portions covering the both ends of the turning axial region and that is supported by a bearing of said stator, and an output portion that is formed to be a portion extending in a radial direction from one of the ends of the turning axial regions, wherein, at each place where the ends of the turning axial region of said permanent magnet face said frame body covering the ends of the turning axial region, one of said permanent magnet and said frame body is provided with a polygonal concavity and another of said permanent magnet and said frame body is provided with a convexity projecting to be fitted in said concavity, and wherein, at a place where said surface parallel with the turning axis of said permanent magnet faces said frame body covering said surface parallel with the turning axis, one of said permanent magnet and said frame body is provided with concavities and another of said permanent magnet and said frame body is provided with convexities projecting to be fitted in said concavities.

2. A blade driving device for cameras according to claim 1, wherein said blade driving device for cameras is a shutter device for cameras.

3. A blade driving device for cameras according to claim 1, wherein said blade driving device for cameras is a stop device for cameras.

4. A blade driving device for cameras, comprising:

a base plate;

a blade; and an actuator in which a rotor is made to turn about a turning axis within a range of a preset angle in a direction determined by a direction of a current supplied to a stator coil;

wherein said rotor of said actuator includes a column-shaped permanent magnet having surfaces perpendicular to the turning axis and a surface parallel with the turning axis and a frame body configured integrally with said permanent magnet, wherein said frame body covers both ends of a turning axial region of said permanent magnet and continuously covers said surfaces perpendicular to the turning axis and said surface parallel with said turning axis of said permanent magnet in such a pattern that a plurality of exposed faces of said permanent magnet are provided, wherein said frame body is provided with a journal that is formed at each of portions covering the both ends of the turning axial region and that is supported by a bearing of said stator, and an output portion that is formed to be a portion extending in a radial direction from one of the ends of the turning axial region, wherein, at each place where the ends of the turning axial region of said permanent magnet face said frame body covering the ends of the turning axial region, one of said permanent magnet and said frame body is provided with a polygonal concavity and another of said permanent magnet and said frame body is provided with a convexity projecting to be fitted in said concavity, wherein, at a place where said surface parallel with the turning axis of said permanent magnet faces said frame body covering said surface parallel with the turning axis, one of said permanent magnet and said frame body is provided with concavities and another of said permanent magnet and said frame body is provided with convexities projecting to be fitted in said concavities, and wherein said permanent magnet is magnetized to have two magnetic poles in a radial direction, and at least one of said surfaces perpendicular to the turning axis has a groove configured along a boundary between said two magnetic poles, a part of said frame body is formed in the groove, and said output portion is situated on an extension line of said boundary.

5. A blade driving device for cameras according to claim 4, wherein said frame body is constructed to form said output portion and another output portion located at symmetrical positions of 180° with respect to said permanent magnet.

* * * * *